Feb. 3, 1931.   J. C. BERTSCH   1,791,441
REFRIGERATING SYSTEM
Filed Dec. 7, 1928   5 Sheets-Sheet 1

Feb. 3, 1931. J. C. BERTSCH 1,791,441
REFRIGERATING SYSTEM
Filed Dec. 7, 1928 5 Sheets-Sheet 3

INVENTOR.
John C. Bertsch
BY Nathaniel Frucht
his ATTORNEY.

Feb. 3, 1931. J. C. BERTSCH 1,791,441
REFRIGERATING SYSTEM
Filed Dec. 7, 1928 5 Sheets-Sheet 4

Feb. 3, 1931.  J. C. BERTSCH  1,791,441
REFRIGERATING SYSTEM
Filed Dec. 7, 1928  5 Sheets-Sheet 5

INVENTOR
John C. Bertsch
BY Nathaniel Frucht
his ATTORNEY.

Patented Feb. 3, 1931

1,791,441

UNITED STATES PATENT OFFICE

JOHN C. BERTSCH, OF MONTREAL, QUEBEC, CANADA

REFRIGERATING SYSTEM

Application filed December 7, 1928. Serial No. 324,354.

This invention relates to improvements in the art of refrigeration, and more particularly to absorption systems in which the circulation of the working media is effected without moving machinery.

In apparatus of this type, all moving machinery is dispensed with either by intermittently and reversibly performing two functions with one element, as for example, the generation and absorption of vapor, or by continuously vaporizing and absorbing the cooling agent in the presence of an inert gas.

These known types have the disadvantage of not being adapted for larger than household capacities, the intermittent type in particular requiring more or less intricate mechanisms for automatically reversing the heat and water supply from one element to another, causing frequent interruptions in the cooling effect and a great waste of heat and cooling water. In the known continuous types of absorption apparatus, the circulation of the working media depends entirely on fixed locations of several parts, a uniform pressure of the gaseous mixtures, and great difference in the specific gravity of the gaseous mixtures, these necessary features producing lack of flexibility in, and limiting the application of, devices of this type.

The disadvantages of these known types are eliminated by the present invention, the principal objects of which are:

To provide an automatic, flexible and hermetically sealed refrigerating apparatus without moving machinery, adapted for any domestic or industrial capacities, and operative with any source of heat; to provide a self-contained refrigerating apparatus wherein circulation of fluid is obtained entirely under the influence of pressure differences within the apparatus; to provide a refrigerating system in which the location of the generator is independent of the location of the absorber; to provide an apparatus which is entirely safe in operation and which has safety means for limiting the pressure; to cause an automatic and continuous circulation of solution between and through the generator and absorber by expelled vapor before its condensation, and a continuous circulation of gaseous mixtures between and through the evaporator and absorber by residual energy of flowing weak solution, liquid, and absorbed gas; to utilize expelled vapor prior to its condensation for elevating the strong solution; to efficiently separate the elevated solution from expanded gas and vapor and to rectify the vapor prior to condensation; to cause molecular diffusion of vapor and gas for maintaining the vapor content of the gases in the evaporator at normal pressure; to provide efficient means for contacting the liquid and solution with the gaseous mixtures during diffusion and absorption respectively; to cause effective interchange of heat between the solutions leaving and entering the absorber and generator, and particularly between the weak solution and the gaseous mixture entering the absorber; to provide a refrigerating system in which the gas absorbed by the solution assists circulation, and in which the liquid leaving the evaporator is vaporized for cooling purposes.

Further objects, novel features, and advantages will be apparent from the following detailed description and the accompanying drawings, wherein:

Fig. 6 is an elevation, partly in section, of an expander column, and Fig. 6a is a section on line d—d thereof;

Figs. 7 and 8 show sectional views of modified forms of the expander column, Figs. 7a and 8a respectively being sections thereof;

Fig. 9 is a sectional detail of a check valve, Fig. 9a being a section thereof on the line e—e;

Fig. 10 is a sectional detail of a combination check and charge valve;

Fig. 11 is a diagrammatic representation of an absorption system using a single expander column;

Fig. 12 is a view in section of the absorber and cooler, Fig. 12a showing a modified cooling means for the absorber;

Fig. 13 is a section through the fusible plug safety device;

Fig. 14 is a fragmentary sectional view of the top of the absorber, on the line $h$—$h$ of Fig. 12;

Fig. 15 is an enlarged section along line $f$—$f$ of Fig. 12 through the heat exchanger;

The system includes a generator G, an absorber A, an evaporator or cooler E, and a condenser C. The generator G contains a solution 10, which may be ammonia dissolved in water, methylchloride, isobutane or ether dissolved in tetrachlorethane, or any other volatile fluid dissolved in a suitable absorbent.

The absorber A and the evaporator E contain a gaseous mixture having a predetermined base pressure P1, the mixture comprising vapor diffused with an inert gas which is non-condensable at a condensing pressure P2, and which may be air, nitrogen, methane, helium, hydrogen or the like, or mixtures of several of this type.

The generator

Figure 1:
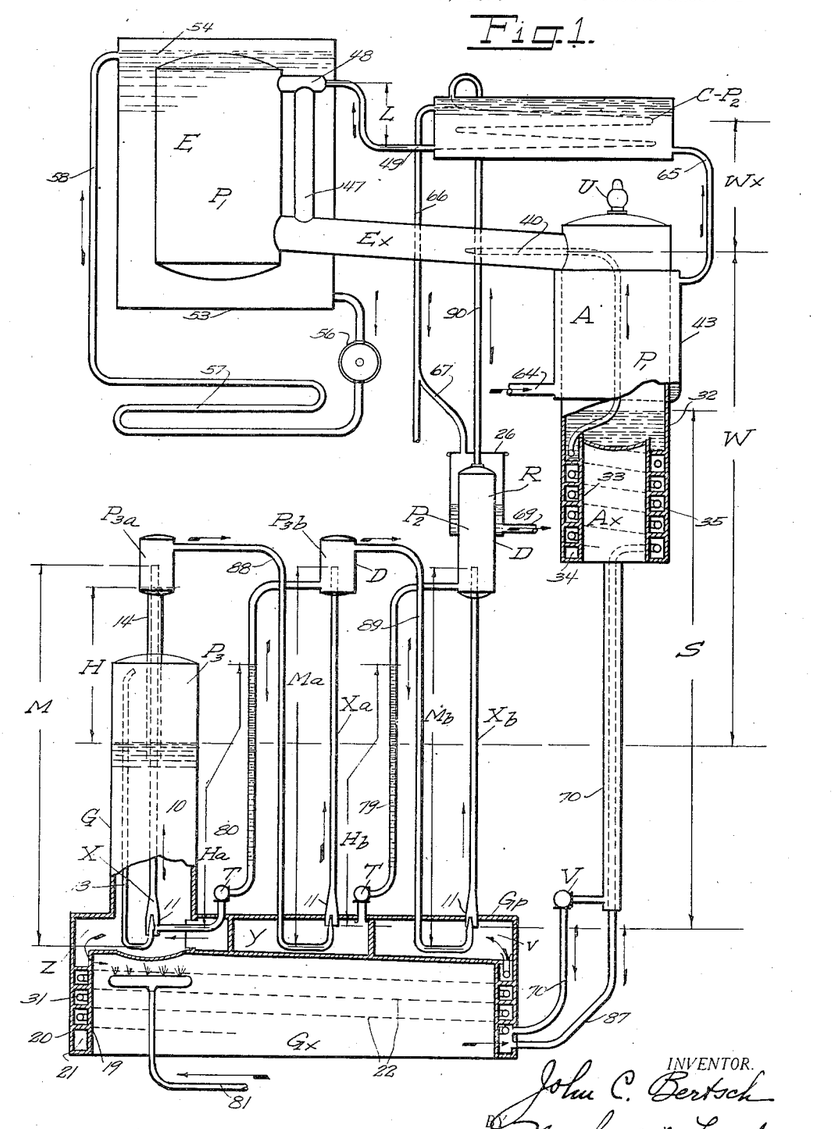
Fig. 1 is a diagrammatic view of an absorption system according to my invention.
Figures 2, 3, 4, 5:
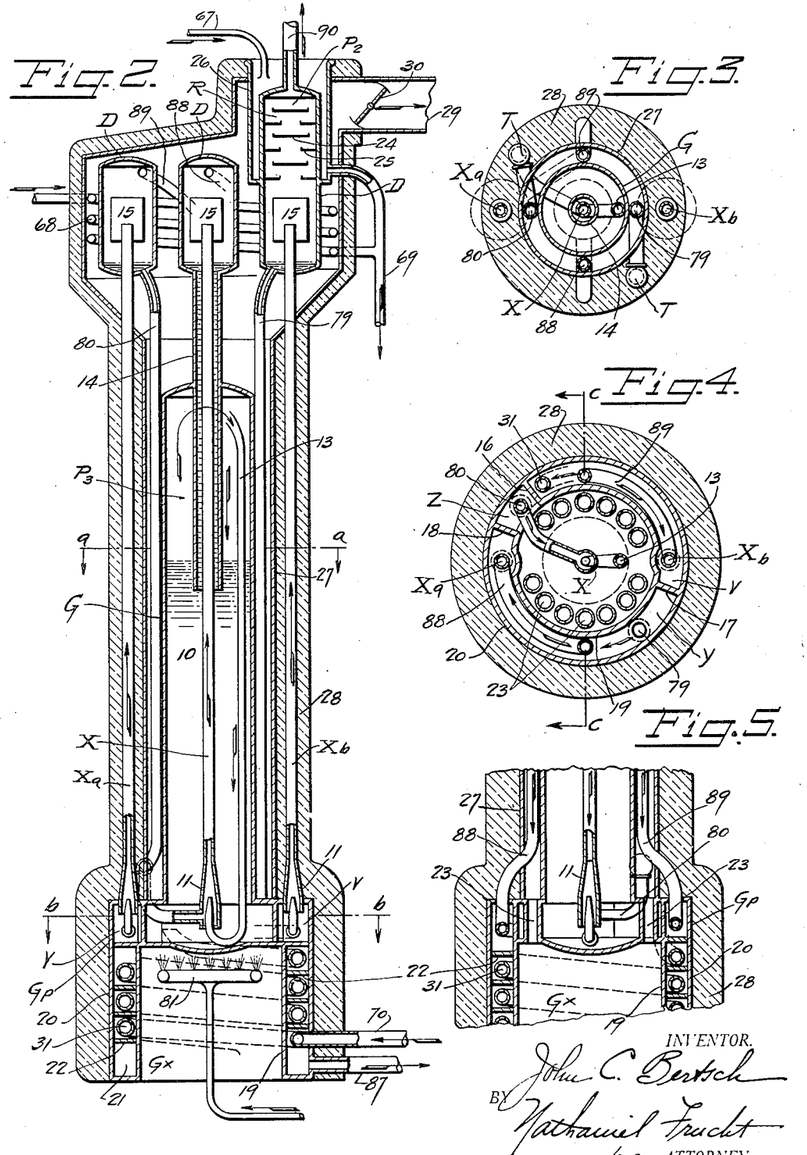
Fig. 2 is a sectional view of the generator shown in Fig. 1, the expander columns being assembled.
Fig. 3 is a section on the line a—a.
Fig. 4 is a section on the line b—b, of Fig. 2.
Fig. 5 is a vertical section through the heating chamber on the line c—c, of Fig. 4.

The generator, shown in section in Fig. 2, is diagrammatically unfolded in Fig. 1 to more clearly show the arrangements. Within the generator is positioned an expander column X, having a mixer 11 at the bottom thereof into which leads a vapor pipe 13. A separator D is connected to the top of the generator by a tube 14 through which the expander column X passes, and includes a baffle 15, as shown in detail in Fig. 6.

Two additional expander columns $Xa$, $Xb$, each having a separator D, are connected in series as shown in Fig. 1, and communicate with lower compartments $v$, $y$, $z$, in a preheating chamber $Gp$ at the lower end of the generator, partitions 16, 17, and 18 separating the compartments from each other.

A heat exchanger $Gx$ is preferably formed as an integral part of the generator, and comprises an inner shell 19 and an outer shell 20, the annular space between the shells being formed into a continuous helical conduit 21, by a spiral plate 22, which may be extended to also form the bottom of compartments $v$ and $y$; compartment $z$ is in open communication with conduit 21 and with the lower portion of the generator.

Within the rectangular conduit 21 of heat exchanger $Gx$ is a coil 31 through which strong solution received through conduit 70 from the absorber A passes to the expander column $Xb$, weak solution passing in counter current relation through conduit 21 into conduit 87 leading from the generator to the absorber. Thus, both solutions travel in a uniform helical path through the heat exchanger $Gx$, the strong solution upwardly and the weak solution downwardly.

For heating the generator with gas or oil, as shown in Figs. 1, 2, 11, and 18, a suitable burner 81 is placed within a combustion chamber formed by the inner shell 19 of the heat exchanger $Gx$, the products of combustion passing through heating tubes 23 and the annular space between the generator and an enclosing jacket 27, see Figs. 2 to 5, the products of combustion passing out through outlet flue 29, controlled by damper 30. The generator is provided with heat insulation 28. When using steam for heating, the generator has a tightly fitting jacket $27s$, as shown in Fig. 20, and the upper part of shell 19 has a pan 82 for collecting water of condensation, which discharges through outlet 83 and steam trap 84, the steam entering through inlet conduit 85. Heating with electricity is accomplished by inserting the required number of heating elements 86, see Fig. 21, into the heating tubes 23. When equipped for steam and electric heating, the jackets 27 and heat insulation 28 are used, as in gas or oil firing, but the flue 29 and damper 30 are omitted and jackets 26 and 27 are joined to form a closed chamber.

The solution pipes 79 and 80, for conducting the solution through the expander columns in series, and the two vapor pipes 88, 89, are placed within the jacket 27, to first subject the solution and the vapor to waste heat and then to direct heating in the chambers $v$, $y$, and $z$ of preheater $Gp$; the expanders $Xa$, $Xb$ are removed from the heating zone and positioned within the heat insulation 28.

Figures 6, 6A, 7, 7A, 8, 8A, 9, 9A, 10, 11:
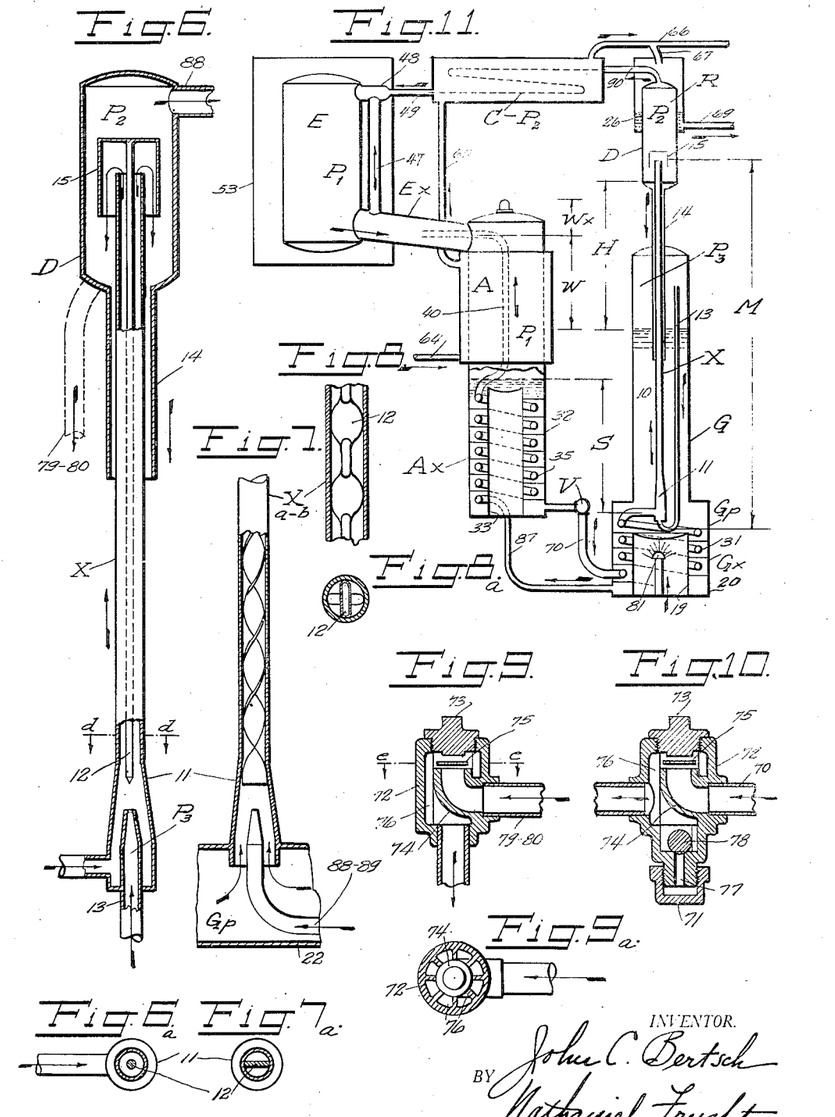

Conduit 70 and solution pipes 79, 80 are provided with check valves V and T respectively to ensure continuous flow in the desired direction, these valves being shown in section in Figs. 9, 9a and 10. Each valve includes a housing 72, a removable plug 73, and a check plate 75, normally closing the upper end of an elbow 74 to which the inlet pipe is secured. The solution passes through passages 76 to the outlet pipe. The valve V also includes a charging passage 77, normally closed by ball check 78 and outer cover plate 71.

As shown in detail in Figs. 6 and 8, each expander column is provided with a displacer 12, which may be a rod, as shown in Fig. 6, a spiral ribbon, as shown in Fig. 7, a tube flattened in different directions alternately, as shown in Fig. 8, or any other form which will properly proportion the cross section area of the expander columns and break up the piston-like layers of vapor and solution forming therein.

The absorber

The absorber A is connected to the generator by the solution pipes 70, 87, pipe 70 encircling pipe 87 to as great an extent as possible, for exchange of heat. As shown in detail in Fig. 12, the absorber comprises a cylindrical shell 32, which may extend downwardly to form the outer shell of a heat exchanger A$x$ having an inner shell 33, between which shells a helical passage or conduit 34 is formed through which the strong solution passes downwardly into pipe 70, the weak solution passing upwardly through coil 35 positioned in the conduit 34.

Figures 12, 12A, 13, 14, 15:
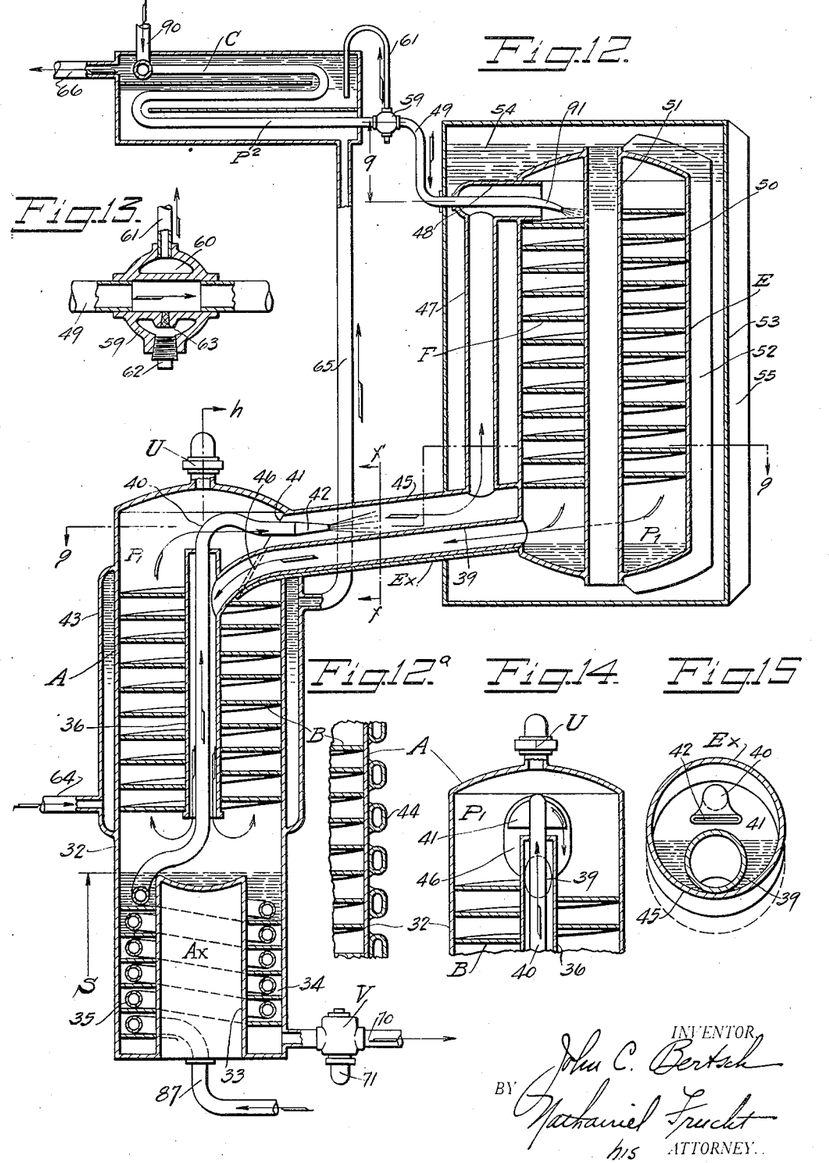
Figures 16, 17, 18, 19, 20, 21:
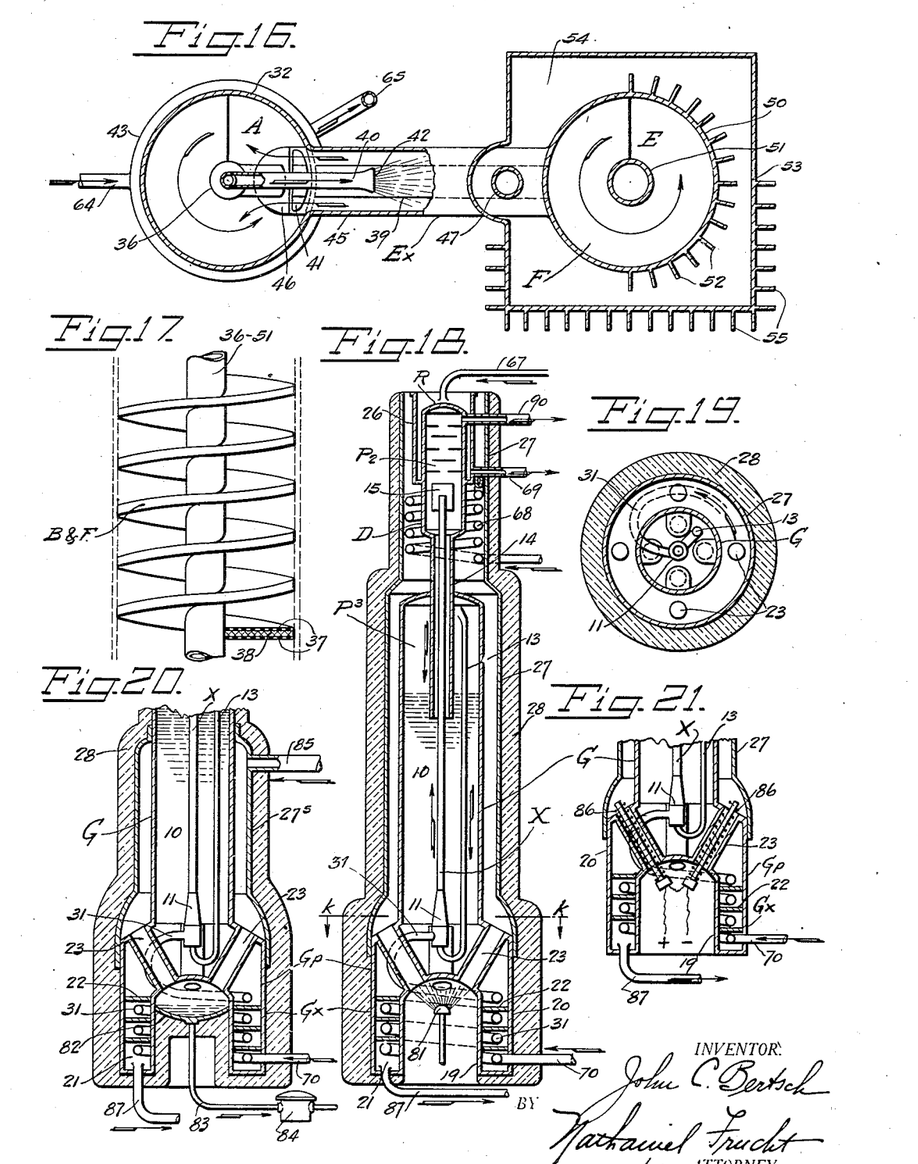
Fig. 16 is a section on the line $g$—$g$ of Fig. 12.
Fig. 17 is an elevation, partly in section, of the helix within the absorber and the cooler.
Fig. 18 is a sectional view of the single column generator of Fig. 11, equipped for heating by gas or oil.
Fig. 19 is a cross section on line $k$—$k$ of Fig. 18.
Figs. 20 and 21 are sectional views of the lower portion of the single column generator, equipped for heating by steam, and by electricity, the heat insulation being omitted in Fig. 21.

Within the absorber is a helix B, shown in detail in Fig. 17, having a central tube 36 and two perforated spiral plates 37 with disks of asbestos cloth 38 therebetween. The absorber 32 is cooled the entire length of helix B by water flowing through an enclosing jacket 43, as shown in Fig. 12, having a water inlet 64 and a water outlet 65, or through a flattened tube, or the like 44 wound around shell 32 and soldered or otherwise secured in contacting relation thereto, as shown in Fig. 12$a$.

The evaporator

Connecting the upper part of the absorber and the lower part of the evaporator E is a heat exchange connection E$x$, consisting of a shell 45 and a conduit 39 positioned therein. Through the closed end of tube 36, which connects with conduit 39, passes an extension 40 of the coil 35, projecting into an opening 41 leading into the shell 45, and terminating therein in a distributing nozzle 42, shown in detail in Fig. 15. The opening 41 is formed by a partition 46 through which conduit 39 passes, see Fig. 14, the upper edge forming a weir over which the pre-cooled weak solution, ejected through nozzle 42, and partially submerging conduit 39, flows into the absorber.

The evaporator E consists of a cylindrical shell 50 which contains a helix F, formed by a central tube 51 and two perforated spiral plates 37 with disks of asbestos cloth 38 therebetween, as in the helix B of the absorber.

Near the evaporator a riser 47 branches off from shell 45 and communicates through a passage 48, through which the liquid pipe 49 passes from the condenser C, with the evaporator above the helix F.

The tube 51 projects through both heads of the evaporator, as shown in Fig. 12, and is used as part of the cooling surface, which may be further increased by using a series of fins 52 around the shell 50, as shown in detail in Fig. 16. A tank 53 entirely encloses the evaporator, the riser 47, and the passage 48, and is filled with a fluent substance which is non-congealable at the temperature to be produced, such as brine, glycerine, or the like. Tank 53 may also be provided with a series of fins 55 for increasing the cold radiating surface, and if it is desired to refrigerate spaces located at a distance from the evaporator, as in apartment houses, cold stores, or the like, a fluid circulating system such as shown in Fig. 1 may be connected with the tank 53.

The fluent substance may then be circulated by a pump 56 from the lower part of tank 53 through refrigerating coils 57 placed within the space or spaces to be refrigerated, into a return pipe 58 leading into the upper part of tank 53.

The condenser

Combined with the separator D of the last expander column X$b$ is a rectifier R cooled by a surrounding water jacket 26 to remove superheat of the vapor and absorbed gas and to condense suspended particles of absorbent, and provided with baffles 24, 25. The vapor and absorbed gas from the rectifier pass into the condenser C through pipe 90, and are condensed and cooled therein, the resulting liquid and cooled gas passing through conduit 49 to the evaporator, either under a head L, as in Fig. 1, on a level with the condenser outlet, as in Fig. 11, or with an elevation drop $q$, as in Fig. 12, depending on the relative location of the condenser and the evaporator.

The condenser C may be of any well-known type, atmospheric or submerged, as in Fig. 12, or of the double pipe type. A construction similar to that of heat exchangers G$x$ and A$x$ is very efficient when the vapor to be condensed is passed downwardly through the coil, and the cooling water passes upwardly through the rectangular helical conduit.

The liquid pipe 49 is provided, near the condenser, with a safety device, indicated in Fig. 12 and shown in detail in Fig. 13. This device includes a housing 59 having an annular space 60, a safety outlet pipe 61, a removable plug 62, and a small bore 63 filled with a metal melting at a temperature corresponding to the desired maximum condensing pressure. As shown in Fig. 12, if the fusible plug melts, the pipe 61 discharges the vapor, gas, and liquid into the condensing water, with which it passes off to waste.

The cooling system

The cooling water first takes up the heat of absorption by entering through pipe 64, passing through jacket 43, tube 44, or the like, and entering the condenser through pipe 65. Taking up the sensible and latent heat of the vapor in the condenser, the water enters outlet pipe 66, from which a branch 67, see Figs. 1 and 18, leads into the jacket 26 of the rectifier R for absorbing the superheat of the vapor and gas, and condensing entrained particles of absorbent. The remaining water may be passed to waste, but it is preferably utilized for cooling the products of combustion by passing through a coil 68 placed within the upper part of jacket 27 into a hot water pipe 69, thus lowering the temperature of the waste gases and heating the waste water for domestic use, boiler feed, or the like.

The operation

The operation of the novel system may be readily understood upon consideration of the multiple expander column system diagrammatically shown in Fig. 1, or the single expander column system diagrammatically shown in Fig. 11.

The apparatus is charged with strong solution of from 40 to 60 percent concentration through valve V, to fill the generator and the heat exchangers to the level indicated in the drawings and to saturate the helix B of the absorber and is then charged with dry air and another inert gas under pressure through a suitable valve U into the top of the absorber, in sufficient quantity to raise the pressure in all parts of the apparatus to that of the boiling point of a weak solution of from 10 to 15 percent less concentration than that of the strong solution, after which caps 71 are closed and sealed, preferably by soldering.

The principle involved in the operation of the invention is that of a U tube, the legs of which contain different heights of solution under different pressures, both legs being balanced by vapor of a pressure greater than the pressures on the solutions. This is only possible in a system operating under three pressures, in which the pressure differences are utilized for causing circulation of the working media; in contradistinction to the prior art wherein a uniform pressure is maintained throughout the system and the circulation of the working media is solely dependent on gravitation.

If in a system resembling a U tube one side contains a relatively cold solution, and the other side a relatively heated solution, and both sides are balanced by the same pressure, the static column of the heated solution is higher than that of the cold solution, since the weight of each solution is the same, but their densities are different.

Now, mixing a vapor of a pressure equal to the sum exerted by the solution and the pressure upon it, with the heated solution, greatly reduces its density, and the vapor, seeking to escape, increases its volume and decreases in pressure while lifting and discharging solution, until its pressure together with that exerted by the lesser weight of the remaining solution balances the combined pressures of the other side. In addition, use is made of Dalton's law, "the total pressure of a gaseous mixture is equal to the sum of the partial pressures each constituent of the mixture would exert if occupying the whole volume of the mixture alone by itself."

When not in operation, the pressure and the level of solution in all parts of the system are assumed to be the same. Heating solution 10 in the generator to the boiling point causes expulsion of vapor and establishment of a higher pressure in the generator, whereby solution is forced into the annular space between expander X and pipe 14, and through conduit 21, pipe 87, and coil 35. The pipe 13 being the only vapor outlet, the pressure increases in the generator until sufficient to displace the solution in pipe 13, and the vapor passes through pipe 13 into mixer 11 and expander X, mixing therein with strong solution preheated to a temperature at which substantially neither evaporation nor absorption will occur.

The weak solution of a relatively high temperature imparts most of its heat to the strong solution of a relatively low temperature, in passing through conduit 21, pipe 87 and coil 35 into the absorber, the strong solution passing in counter current relation through conduit 34, pipe 70 and coil 31 into the expanders. Owing to the film and plate resistances as well as the radiation losses, the heat exchange in $Gx$ does not raise the temperature of the strong solution sufficiently to prevent excessive re-absorption of vapor in expander X, and the strong solution is therefore additionally preheated after leaving $Gx$ and before entering mixer 11.

An excessive reabsorption in expander X would diminish the volume of vapor required for operating expanders $Xa$ and $Xb$, while the expulsion of vapor in expander X would weaken the solution entering the generator G through pipe 14, thus making it difficult to maintain the generator pressure. Care must therefore be taken to preheat the strong solution sufficiently, but only to a temperature below that in the generator, which is accomplished by utilizing the film and plate resistances as a safe-guard for limiting the temperature, and by preheating the solution indirectly by waste heat and by the heat of the weak solution in the generator.

The solution pipes 79 and 80 and the vapor pipes 88 and 89 are placed within jacket 27 to absorb waste heat, the solution and vapor also receiving heat in chambers $v, y, z$ of the preheater $Gp$; the expanders $Xa$ and $Xb$, however, are removed from the heating zone and placed within the insulation 28. Solution pipes 79, 80, and 70 are provided with check valves to insure continuous flow in the proper direction. The vapor and solution cycles run in opposite directions, the former beginning in the generator and ending in the condenser, whereas the latter begins in the mixer of the expander column discharging into the condenser and ends in the generator.

Upon mixing one volume of preheated solution with from 2 to 3 volumes of vapor in mixer 11 of expander X, the vapor expands from a pressure P3 to a pressure P3a while doing work by elevating the solution into the separator D of expander X, the vapor and solution separating therein by virtue of the greatly reduced velocity, since the separator is much larger in cross-section, and the use of the gravity deflector 15. After separation the solution gravitates into the generator through conduit 14 while the vapor passes upwardly and out through pipe 88 into the mixer of expander Xa, where it mixes with preheated solution entering through pipe 79. The vapor then further expands from pressure P3a to pressure P3b while elevating the solution in compartment y into separator D of expander Xa, and after separation therein passes through pipe 89 into the mixer of expander Xb, where it elevates the solution from compartment V while expanding to the pressure P2 before passing into the rectifier R, pipe 90, and the condenser C. The preheated solution from the absorber is therefore successively lifted through compartments v, y, and z into the generator. Depending on the number and height of the expander columns used, the preheated solution may be elevated without any machinery from the absorber pressure P1 to any desired generator pressure P3 by the expansion of vapor from the latter pressure to the lower condensing pressure P2, the performance being analogous to that of an expander engine driving a pressure pump.

But since changes in temperature and pressure of a vapor are synonymous, the pressure drop from stage to stage causes a corresponding drop in temperature, which must be compensated for to prevent a re-absorption of vapor beyond the permissible limit, this limit being the saturation point of the solution at the temperature of the mixture of vapor and solution passing through expander X necessary for maintaining the generator pressure P3. This is accomplished by preheating the solution and vapor after each stage, subjecting the former within pipes 79 and 80 first to the waste heat within jacket 27 and then preheating the same in the compartments v, y, and z of preheater Gp, and subjecting the vapor in pipes 88 and 89 also to the waste heat within jacket 27 and to the preheated solution in these compartments.

Furthermore, just as slippage of vapor and solution past the pistons of an expander engine and pressure pump, respectively, decreases the efficiency of the machine, so does slippage of vapor and solution past the piston-like layers formed by each within an expander column decrease the circulation of solution, the rate of absorption and the cooling effect. It is therefore important to correctly proportion the cross area of the expander columns and to break up the piston-like layers of vapor and solution forming therein. If the cross area of the expanders is too large, the vapor bubbles through the solution without lifting the same, and if too small, the friction loss is too great.

Upon observing the formation of piston-like layers of vapor and solution within an expander column, and the gradual disappearance of the latter before reaching the separator D, a rod 12 was inserted into the column, as in Figs. 6 and 6a, which immediately broke up the vapor layers into a number of smaller globules which mixed with the layers of solution and rose with the latter into separator D. Therefore, according to the size of the expander columns required, distributors 12, either in form of rods or tubes, as in Figs. 6 and 6a, or in form of twisted flat bars as in Figs. 7 and 7a, or in form of alternately flattened tubes, as in Figs. 8 and 8a, are necessary for adjusting the cross area of commercial tubing and pipes and for distributing the vapor through the solution within the expanders.

The vapor and absorbed gas after being expanded as described enter condenser C and are condensed and cooled therein respectively, and pass into the evaporator through a pipe 49, which has a restricted outlet 91, through which the liquid sprays upon the helix F of the evaporator over which it flows while saturating the fibrous discs 38 between the perforated plates 37, evaporating in presence of inert gas, thus producing cold and forming a rich mixture of vapor and gas by mutual diffusion.

The diffusion is proportional directly to the surface and inversely to the thickness of the layers of vapor and gaseous mixture, which law applies also with equal force to the evaporation and absorption of a fluid.

In the evaporator, the liquid is spread upon the helix F, and flowing over the uniformly descending perforated plates 37, saturates the fibrous discs 38, thus offering as active surfaces for evaporation and diffusion the top and bottom of the plates and discs in contradistinction to the metal plates used in the prior art, of which only the top is active, and through the tortuous apertures of which the mixture passes in alternately vertical and horizontal directions, whereas in this invention the helical space between the discs forms a uniform, continuous and unobstructed passage for the gaseous mixture, which acts with each one half its thickness upon the upper and lower side of the saturated discs and prevents the formation of neutral layers of inert gas.

Upon reaching the bottom of the evaporator, the enriched gaseous mixture together with any remaining liquid passes through conduit 39 of heat exchanger Ex into the central tube 36 of absorber A as indicated by the arrows.

The weak solution under pressure from the generator, cooled by the strong solution in heat exchanger Ax is further cooled by the descending rich gaseous mixture and remaining liquid in central tube 36 while passing through pipe 40 within the latter, and issues in velocity jets through nozzle 42 into the heat exchanger Ex, accumulating therein and partially submerging the vapor conduit 39, to be still further cooled by the relatively cold gaseous mixture and remaining liquid passing through the same. The temperature of the absorbent being the leading factor in the absorption of vapor, every possible means for lowering its temperature must be employed, for the lower the temperature the greater the volume of vapor it absorbs, and therefore the greater the difference between the concentrations of the weak and strong solutions in circulation, an essential feature of efficient operation.

The cooled weak solution flows from the heat exchanger Ex over the edge of plate 46 upon the helix B, and flowing over the uniformly descending perforated spiral plates thereof, saturates the fibrous discs 38 and drips through their porous structure, thus forming large wetted surfaces for the absorption of vapor from the gaseous mixture. The gaseous mixture rich in vapor content issuing at the bottom of the helix B from conduit 36, rises through the space formed by the spiral plates, and being in close contact with the top and bottom of the wetted discs, gives up vapor to the descending solution, which by passing through the helix changes from weak to strong solution, whereas the rich gaseous mixture changes to one poor in vapor content.

It must be clearly understood, that in practical continuous operation it is impossible to separate solutions and gaseous mixtures into their constituents, so that neither absorbent nor inert gas free of fluid exist in any part of the system, but only absorbent or inert gas more or less mixed with fluid, hence the terms "strong" and "weak" solution, or "rich" and "poor" gaseous mixtures, respectively.

As explained hereinafter by a numerical example, the poor gaseous mixture reaching the top of the absorber and entering the heat exchanger Ex through opening 41 is forced through heat exchanger Ex and riser 47 by the aspirating action of the jets of weak solution issuing through nozzle 42 imparting their velocity to the gaseous mixture. While in contact with unsubmerged portion of conduit 39 and with the surface of cooled solution in Ex and the walls of conduits 47 and 48, the poor gaseous mixture is cooled prior to its entry into the evaporator. The velocity imparted to the gaseous mixture by the jets of weak solution is then increased by the liquid and gas issuing through outlet 91 at a velocity produced by the drop in pressure from P2 to P1; thus the circulation of the gaseous mixture through the absorber and cooler is effected and maintained by the combined residual energy of the circulating weak solution, and the liquid and absorbed gas, irrespective of the differences in the specific gravity which are the sole motivating agency of the prior art.

The relative value of the different pressures and pressure equivalents of the several static columns of solution are clearly shown by numerical examples, in which the base pressure P1 is assumed as having the value (100) which is the minimum pressure to which a system must be charged with inert gas. Measuring then the height of the several static columns from the drawings in millimeters, and applying for their respective contents fair averages of the specific gravities in an ammonia system, the product of the height and the specific gravity of each column represents the pressure factor thereof, which with the pressure upon the column gives its relative pressure equivalent.

The characteristics of the static columns of Fig. 1 are then as follows:—

| Column | Contents | Per cent NH₃ | Height (millimeters) | Specific gravity | Pressure factor |
|---|---|---|---|---|---|
| S | Cold strong solution | 40% | 129 | .86 | 110.94 |
| W | Cold weak solution | 25% | 123 | .90 | 110.70 |
| H | Hot strong solution | 40% | 38 | .75 | 28.50 |
| Ha and Hb | Hot strong solution | 40% | 76 | .75 | 57.00 |
| M, Ma and Mb | Mixture of one to one and one-half volumes of preheated strong solution and vapor, respectively | | | | |
| L | Anhydrous liquid ammonia | | 95 | .30 | 28.50 |
| | | | 16 | .63 | 10.08 |

The relative pressure equivalents are then:—

Expander Xb $\begin{cases} P1 \text{ plus } S & \text{equals } P3b \\ 100 \quad 110.94 & 210.94 \end{cases}$ equals Mb plus P2 = 28.50 plus 182.44

Expander Xa $\begin{cases} P2 \text{ plus } Hb & \text{equals } P3a \\ 182.44 \quad 57.00 & 239.44 \end{cases}$ equals Ma plus P3b = 28.50 plus 210.94

Expander X $\begin{cases} P3b \text{ plus } Ha & \text{equals } P3 \\ 210.94 \quad 57.00 & 267.94 \end{cases}$ equals M plus P3a = 28.50 plus 239.44

Work done $\begin{cases} P3a \text{ plus } H & \text{equals } P3 \\ 239.44 \quad 28.50 & 267.94 \end{cases}$ equals P1 plus W plus Wx = 100 plus 110.70 plus 57.24 and $\begin{cases} P2 \text{ equals} & P1 \text{ plus } L \text{ plus } Lx \\ 182.44 \quad 100 & 10.08 \quad 72.36 \end{cases}$ The work done by the expansion of the vapor from the generator pressure P3 to the condensing pressure P2 is therefore the delivery of the strong solution from the absorber into the generator, the elevation of the weak solution above the generator level into the absorber, and the circulation of the gaseous mixtures by the convertible residual energy $Wx$ of the flowing weak solution together with the convertible energy $Lx$ of the flowing liquid ammonia, the former representing 51.5 per cent, and the latter 65.2 per cent of the working head S. As the number and height of the vapor expanders may be changed at will, any local condition, required capacity, or desired potential and kinetic energies for circulating the solutions and gaseous mixtures, respectively, can be arranged for.

In like manner each of the sums P1 plus S, P2 plus M, P2 plus H, and P1 plus W plus $Wx$ of the single column unit shown in Fig. 11 is equal to P3.

Thus it is clear that the three pressure system according to this invention possesses a flexibility which permits its application to any operating conditions by arranging the number and height of the expanders as required for any capacity, working media and circulation of the latter by the positive force of pressure differences, without resorting to limited and variable forces due to differences in specific gravity. The generator may be located at any distance from the absorber and the evaporator; any desired capacity may be obtained; high concentrations of solution may be employed without danger of boiling over into the condenser; all the vapor expelled from the solution is utilized as motive fluid, and the inert gas absorbed by the solutions assists circulation by expanding with the vapor and is directly discharged into the condenser.

What I claim is:

1. A three pressure absorption process of refrigeration comprising continuously expelling vapor from a strong solution of refrigerant by heat at a pressure superior to the condensing pressure and condensing the same; vaporizing the resulting fluid and absorbing the same by a weak solution in the presence of an inert gas at a pressure inferior to the condensing pressure, thus forming rich and poor gaseous mixtures, respectively; circulating said solutions by the potential energy of the expelled vapor prior to its condensation and said mixtures by the residual kinetic energy of the circulating weak solution and liquid fluid; said three pressures being balanced by hydrostatic columns, namely:—the superior and condensing pressures by a column of hot strong solution, the superior and inferior pressures by a column of cold weak solution, and the condensing and inferior pressures by a column of liquid fluid.

2. The process of absorption refrigeration which comprises continuously generating vapor of a pressure higher than the condensing pressure by heating pre-heated strong solution; expanding said vapor to the condensing pressure in the act of elevating pre-heated strong solution to the height of a hydrostatic pressure balancing said higher pressure; separating said elevated solution from the expanded vapor and absorbed gas and condensing the vapor and cooling the gas; vaporizing the condensed fluid in the presence of an inert gas at a pressure below the condensing pressure and absorbing fluid from the rich gaseous mixture so formed by weak solution resulting from said heating, thus forming strong solution and a poor gaseous mixture, said lower and condensing pressures being balanced by a column of fluid; pre-heating said strong solution by heat exchange with said weak solution and waste heat resulting from said initial heating prior to the latter; and circulating said solutions by the potential energy of the generated vapor and said mixtures by the residual kinetic energy of the circulating weak solution and liquid fluid.

3. That improvement in the art of absorption refrigeration by the aid of solutions and gaseous mixtures of refrigerant, which consists in causing the solutions and refrigerant together with said mixtures contacting therewith during absorption and evaporation of refrigerant, respectively, to flow in a continuous and uniformly helical motion, said contacting solutions and mixtures flowing in counter-current relation while said contacting refrigerant and mixtures flow in the same direction.

4. The process claimed in claim 2, in which the pressure differences comprise a plurality of pressure drops caused by performing work, namely:—putting strong solution from the lowest absorber-evaporator pressure under the highest generator pressure by expanding said motive vapor to an intermediate condenser pressure, and elevating weak solution and liquid fluid to hydrostatic heads in excess of those required for their delivery into the absorber and evaporator, respectively, the excess of said heads representing said residual energy causing circulation of said gaseous mixtures.

5. In a refrigerating system comprising an evaporator and an absorber in which a plurality of substances circulate, spaced perforated helical plates in said evaporator and absorber having fibrous absorbent material therebetween for contacting said substances with each other.

6. In a continuous absorption refrigerating system, a generator, an absorber and a condenser, means for heating a solution in said generator to generate vapor under pressure; a series of vapor expanders between said generator and condenser connected in circuit therewith, the first expander communicating with said generator and the last with said condenser, each expander being provided with a pre-heating chamber; conduits leading additional solution from said absorber to the pre-heating chamber of the last expander and from the latter through said series of expanders and pre-heating chambers to that of the first expander; and means whereby said vapor under pressure passes through the pre-heating chamber of said first expander and through the same and said series of pre-heating chambers and expanders into the condenser and forces pre-heated additional solution from the last expander through said series into the generator, each of said conduits being provided with means for flowing said additional solution continuously in one direction, the vapor expanders containing means for properly proportioning the cross sectional area thereof and for preventing formation of layers of solution and vapor therein.

7. In a refrigerating system comprising a generator, a condenser, an evaporator and an absorber, means for charging the system with liquid at a low portion thereof, and with an inert gas at a high portion thereof.

Signed at New York in the county of N. Y. and State of N. Y., this 6th day of Dec., A. D. 1928.

JOHN C. BERTSCH.